(12) United States Patent
Lu et al.

(10) Patent No.: US 8,572,088 B2
(45) Date of Patent: Oct. 29, 2013

(54) AUTOMATED RICH PRESENTATION OF A SEMANTIC TOPIC

(75) Inventors: Lie Lu, Beijing (CN); Wei-Ying Ma, Beijing (CN); Zhiwei Li, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1960 days.

(21) Appl. No.: 11/256,411

(22) Filed: Oct. 21, 2005

(65) Prior Publication Data

US 2007/0094251 A1 Apr. 26, 2007

(51) Int. Cl.
*G06F 7/00* (2006.01)
*G06F 17/30* (2006.01)

(52) U.S. Cl.
USPC .......................................................... 707/739

(58) Field of Classification Search
USPC .................................................... 707/104.1, 3
See application file for complete search history.

(56) References Cited

U.S. PATENT DOCUMENTS

| | | | |
|---|---|---|---|
| 5,325,298 A | 6/1994 | Gallant | |
| 5,488,725 A | 1/1996 | Turtle et al. | |
| 6,405,188 B1 | 6/2002 | Schwartz et al. | |
| 6,424,968 B1 | 7/2002 | Broster et al. | |
| 6,804,688 B2 | 10/2004 | Kobayashi et al. | |
| 6,925,433 B2 | 8/2005 | Stensmo | |
| 2002/0007364 A1 | 1/2002 | Kobayashi et al. | |
| 2002/0129011 A1* | 9/2002 | Julien | 707/3 |
| 2002/0194158 A1 | 12/2002 | Stensmo | |
| 2004/0093349 A1* | 5/2004 | Buinevicius et al. | 707/104.1 |
| 2004/0230572 A1 | 11/2004 | Omoigui | |
| 2005/0021324 A1 | 1/2005 | Brants et al. | |
| 2005/0021490 A1 | 1/2005 | Chen et al. | |
| 2005/0071150 A1 | 3/2005 | Nasypny | |
| 2005/0216443 A1 | 9/2005 | Morton et al. | |

FOREIGN PATENT DOCUMENTS

| | | |
|---|---|---|
| GB | 2359210 A | 8/2001 |
| KR | 20020003701 A | 1/2002 |

OTHER PUBLICATIONS

Microsoft Power Point 2003 as described in http://office.microsoft.com/training/Training.aspx?AssetID=RC010713231033&CTT=6& Origin=RC010713231033, Microsoft Power Point 2003 released in 2003.*
PCT International Search Report dated Mar. 26, 2007, International application No. PCT/US2006/041092, 3 pages.
Alsabti, et al., "An Efficient K-Means Clustering Algorithm", pp. 6, Jan. 1, 1997.
Jebara, et al., "Maximum Conditional Likelihood via Bound Maximization and the CEM Algorithm", pp. 7, 1999.
Yang, et al., "Learning Approaches for Detecting and Tracking News Events", pp. 19, Jan. 1, 2000.

(Continued)

*Primary Examiner* — Alexey Shmatov
(74) *Attorney, Agent, or Firm* — Lee & Hayes, PLLC (57) ABSTRACT

Automated rich presentation of a semantic topic is described. In one aspect, respective portions of multimodal information corresponding to a semantic topic are evaluated to locate events associated with the semantic topic. The probability that a document belongs to an event is determined based on document inclusion of one or more of persons, times, locations, and keywords, and document distribution along a timeline associated with the event. For each event, one or more documents objectively determined to be substantially representative of the event are identified. One or more other types of media (e.g., video, images, etc.) related to the event are then extracted from the multimodal information. The representative documents and the other media are for presentation to a user in a storyboard.

17 Claims, 6 Drawing Sheets

(56) References Cited

OTHER PUBLICATIONS

Zhang, et al., "Novelty and Redundancy Detection in Adaptive Filtering", ACM, 2002, pp. 8.
Bikel, et al., "An Algorithm that Learns What's in a Name", Journal of Machine Learning, Special Issue on natural language learning, vol. 34, No. 1-3, Feb. 1999, pp. 211-231.
The European Office Action mailed Feb. 19, 2013 for European patent application No. 06801140.2, a counterpart foreign application of US patent No. 7,788,263, 7 pages.
The Extended European Search Report mailed Feb. 13, 2012 for European patent application No. 06801140.2, 11 pages.
Jinwoun, et al., "Story Board Contruction using Segmentation of MPEG Encoded News Video", Circuts and Systems, 2000, Proceedings of the 43rd IEEE Midwest Symposuim on Aug. 8-11, 2000, p. 758-761.
Kanungo et al., "An Efficient K-Means Clustering Algorithm: Analysis and Implementation", IEEE Transactions on Pattern Analysis and Machine Intelligence, vol. 24, No. 7, Jul. 2002, pp. 881-892.
Li, et al., "A Probablistic Model for Retrospective News Event Detection", SIGIR 2005, Aug. 15-19, 2005, Salvador, Brazil, ACM, pp. 106-113.
Lu, et al., "Automated Rich Presentation of a Semantic Topic", 13th Annual ACM International Conference on Multimedia, Nov. 6, 2005, p. 745-753.
McCallum, et al., "A Comparison of Event Models for Naive Bayes Text Classification", Workshop held in conjunction with ICML and AAAI, Jul. 1998, pp. 41-48.
Moringa, et al., "Tracking Dynamics of Topic Trends Using a Finite Mixture Model", Proceedings of the Tenth ACM SIGKDD International Conference on Knowledge Discovery and Data Mining, Aug. 22, 2004, pp. 811-816.
Olier, et al., "Comparative Assessment of the Robustness of Missing Data Imputation Through Generative Topographic Mapping", Computational Intelligence and Bioinspired Systems, Lecture Notes in Computer Science, vol. 3512, 2005, pp. 787-794.
Zhong, et al., "A Comparative Study of Generative Models for Document Clustering", SIAM International Conference Data Mining Workshop on Clustering High Dimensional Data and Its Applications, May 2003, 14 pgs.

\* cited by examiner

AUTOMATED RICH PRESENTATION OF A SEMANTIC TOPIC

BACKGROUND

To understand a semantic topic, people usually search information from (multimedia) database or the Internet. The search results typically result in a bulk of unorganized information with many duplicates and/or noise. Browsing such unorganized, duplicate, and/or noisy information to identify and understand media content of interest can be labor-intensive and time-consuming.

SUMMARY

This Summary is provided to introduce a selection of concepts in a simplified form that are further described below in the detailed description. This Summary is not intended to identify key features or essential features of the claimed subject matter, nor is it intended to be used as an aid in determining the scope of the claimed subject matter.

In view of the above, automated rich presentation of a semantic topic is described. In one aspect, respective portions of multimodal information corresponding to a semantic topic are evaluated to locate events associated with the semantic topic. The probability that a document belongs to an event is determined based on document inclusion of one or more of persons, times, locations, and keywords, and document distribution along a timeline associated with the event. For each event, one or more documents objectively determined to be substantially representative of the event are identified. One or more other types of media (e.g., video, images, etc.) related to the event are then extracted from the multimodal information. The representative documents and the other media are for presentation to a user in a storyboard.

BRIEF DESCRIPTION OF THE DRAWINGS

In the Figures, the left-most digit of a component reference number identifies the particular Figure in which the component first appears.

DETAILED DESCRIPTION

Overview

Systems and methods for automated rich presentation of a semantic topic are described below in reference to FIGS. 1-8. A "semantic topic" is arbitrary. For instance, a semantic topic may be one or more keywords (e.g., input by a user as part of a search query, etc.) representing one or more events, a person's name, or anything else. For example, respective semantic topics include the "World Cup 2002", "USA election", "Halloween", "Harry Potter", etc. In some cases, a semantic topic may represent a target topic and an event. For example, "Halloween" can be both a semantic topic and an event. To richly present a semantic topic, the systems and methods analyze multimedia content to identify and extract multimodal information (e.g., image, text, audio, and/or video) associated with the semantic topic. This multimodal information includes documents such as news articles describing events and representative media content (e.g., images, video, etc.). The systems and methods objectively identify portions of the multimodal information that are most representative of the semantic topic. The systems and methods integrate this representative content into a storyboard for presentation to user of a concise and informative summary of the semantic topic. This organized presentation allows the user to quickly grasp and understand the semantic topic of interest, and thereby provides results inverse to that generally provided to a user by conventional multimedia content analysis (i.e., a bulk of unorganized information).

These and other aspects for automatic rich presentation of semantic topics in a storyboard are now described in greater detail.

An Exemplary System

Although not required, embodiments for automated rich presentation of semantic topics are described in the general context of computer-program instructions being executed by a computing device such as a personal computer. Program modules generally include routines, programs, objects, components, data structures, etc., that perform particular tasks or implement particular abstract data types. While the systems and methods are described in the foregoing context, acts and operations described hereinafter may also be implemented in hardware.

Figure 1:
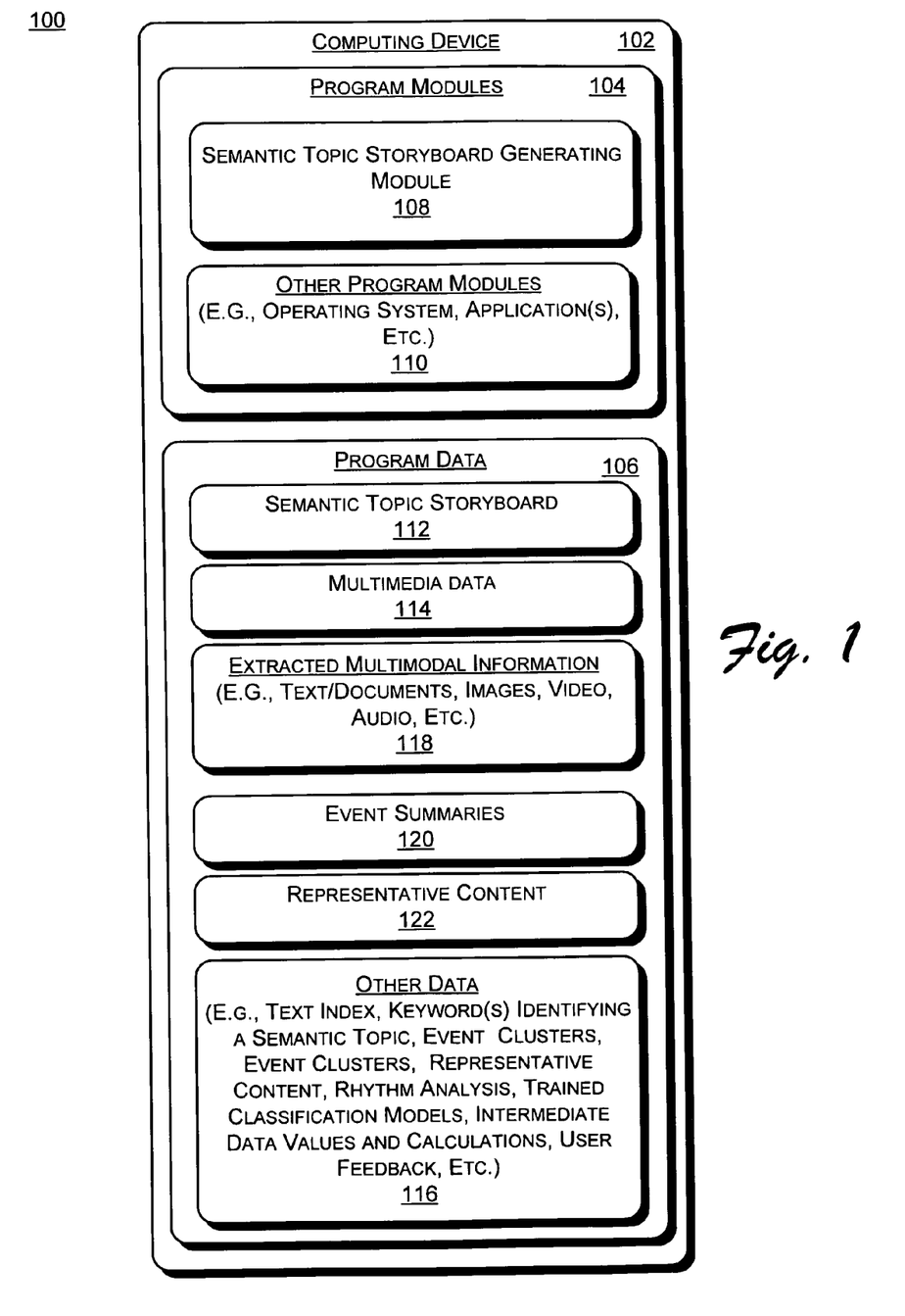
FIG. 1 shows an exemplary system for automated rich presentation of a semantic topic, according to one embodiment.

FIG. 1 shows an exemplary system 100 for automated rich presentation of a semantic topic. In this implementation, system 100 includes a general-purpose computing device 102. Computing device 102 represents any type of computing device such as a personal computer, a laptop, a server, handheld or mobile computing device (e.g., a small form factor device), etc. Computing device 102 includes program modules 104 and program data 106 for automatic rich presentation of semantic topics. Program modules 104 include, for example, semantic topic storyboard generator module 108 and other program modules 110 such as an operating system, Web crawler application, etc.

Semantic topic storyboard generator module 108 (hereinafter often referred to as "storyboard generator 108") generates semantic topic storyboard 112 from multimedia data 114. In one implementation, multimedia data 114 represents data from one or more Web-based multimedia databases (e.g., a news web site, etc.). In one implementation, storyboard generator 108 or an "other program module" 110 such as a Web crawler application evaluates documents from these web sites in advance to build a full text index for use by storyboard generator 108 to obtain documents relevant to a semantic topic. These crawling operations enable system 100 to utilize one or more conventional information retrieval technologies such as search query expansion to remove query ambiguousness and thereby, identify and index documents (multimodal information) of greater potential relevancy to the semantic topic.

Storyboard generator 108 receives one or more keywords identifying a semantic topic (also referred to herein to as a "target topic") of interest. In one implementation, a user presents the keywords as a search query. Responsive to receiving the keywords, storyboard generator 108 extracts multimodal information 118 (e.g., text, images, video, audio, etc.) relevant to the target topic from multimedia data 114. In one implementation, a user interacts with storyboard generator 108 to provide feedback indicating which portions of the extracted information are relevant, provide other/additional relevant data (e.g., media, image sequences, geographic information, etc.), etc.

Storyboard generator 108 analyzes the extracted multimodal information 118 (and any other/additional relevant data provided by the user) to identify and cluster documents describing events associated with the target topic. An event is a specific thing that occurs at a specific time and place. For each event, there may be many documents including articles reporting information about persons, locations, keywords, time, etc, associated with the event. A semantic topic may be associated with multiple events. For example, the semantic topic "World Cup 2002" corresponds to many events including, for example, each match or competition. The articles associated with an event may include information that is very relevant to the semantic topic. In view of this, storyboard generator 108 groups the identified documents into respective event clusters 120, wherein each cluster represents a respective event associated with the semantic topic.

Storyboard generator 108 then identifies one or more documents that is/are objectively more representative of each event cluster 120 (e.g., an event summary). These representative documents are shown as a respective portion of representative content 122. Next, storyboard generator 108 evaluates the extracted multimodal information 118 to identify media such as images, video clips, etc., related to each event (i.e., event cluster 120). This related media is also shown as a respective portion of representative content 122. Storyboard generator 108 integrates the representative content (i.e., documents and other media) for presentation to a user in storyboard 112.

In one implementation, storyboard generator 108 synchronizes music or other audio with the storyboard presentation.

We now describe exemplary operations for semantic topic event clustering and summarizing, identifying media related to the events, integrating event representative documents with related media into a layout for storyboard 112, and synchronizing audio with the integrated content for presentation to a user.

Multiple Event Clustering—Multimodal Retrospective Event Detection

To group documents into different events, storyboard generator 108 calculates the probability that a document belongs to an event, that is $p(e_j|x_i)$, where $x_i$ is the ith obtained document and $e_j$ is the jth event. To calculate this probability value, storyboard generator 108 determines the likelihood, $p(x_i|e_j)$ based on Bayesian criteria.

More particularly, an event (and thus the document describing the event) can be represented by four primary elements: who (persons), when (time), where (locations) and what (keywords). Assuming that a document is the result of an event, and the four primary elements are independent, the likelihood that a document belongs to an event is represented by the following generative model, $$p(x_i|e_j) = p(name_i|e_j)p(loc_i|e_j)p(key_i|e_j)p(time_i|e_j) \quad (1)$$

where $name_i$, $loc_i$ and $key_i$, $time_i$ are feature vectors representing persons, locations, keywords and time in the ith document, respectively. In more detail, $name_i$ is a list $<c_{i1}, c_{i2}, \ldots, c_{iNp}>$, where $c_{in}$ is the occurrence frequency of the $person_n$ appears in the document $x_i$, and $person_n$ is the nth person in the person vocabulary, which is composed of all the persons appeared in all the obtained documents. Techniques to extract such elements (e.g., persons, organizations, locations, date, time, money and percent) from a document are known.

In this implementation, an organization entity is considered a person entity.

Assuming $N_p$ is the size of person vocabulary, $p(name_i|e_j)$ is further expressed by $$p(name_i | e_j) = \prod_{n=1}^{N_p} p(person_n | e_j)^{c_{in}} \quad (2)$$

Since the person, location and keyword are discrete variables represented by words, and the probability of location and keyword can be also defined similarly as that of person in (2), storyboard generator 108 uniformly represents the probability $p(person_n|e_j)$ (correspondingly, the $p(location_n|e_j)$ and $p(keyword_n|e_j)$) as $p(w_n|e_j)$, which denotes the probability that the word $w_n$ appears in the event $e_j$ On the other hand, the time of an event usually lasts a continuous duration. It is also observed, especially in the news domain, that the documents about an event are more plentiful at the beginning stage of the event as compared to a decreasing number of documents near the end of an event. Therefore, storyboard generator 108 utilizes a Gaussian model $N(u_j, \sigma_j)$ to roughly represent the probability $p(time_i|e_j)$, where $u_j$ and $\sigma_j$ is the mean and standard deviation, respectively.

To estimate the probability $p(e_j|x_i)$, storyboard generator 108 estimates the model parameters $\theta=\{p(w_n|e_j), \mu u_j, \sigma_j, 1 \le j \le K\}$, assuming K is the number of events (salient number of events). In this implementation, the Maximum Likelihood is used to estimate the model parameters, as follows:

$$\theta^* = \operatorname{argmax}_\theta \log(p(X|\theta)) = \operatorname{argmax}_\theta \log\left(\prod_{i=1}^{M} p(x_i|\theta)\right) \quad (3)$$

$$= \operatorname{argmax}_\theta \sum_{i=1}^{M} \log\left(\sum_{j=1}^{K} p(e_j)p(x_i|e_j, \theta)\right)$$

where X represents the corpus of the obtained documents; M and K are number of documents and events, respectively.

An Expectation Maximization (EM) algorithm is applied by storyboard generator 108 to maximize the likelihood, by running E-step and M-step iteratively. A brief summary of these two steps is listed as follows.

In E-step, the posterior probability $p(e_j|x_i)$ is estimated as:

$$p(e_j | x_i)^{(t+1)} = \frac{p(x_i | e_j)^{(t)} p(e_j)^{(t)}}{p(x_i)} \quad (4)$$

where the upper script (t) indicate the tth iteration.
In M-step, the model parameters are updated, as follows:

$$p(w_n | e_j)^{(t+1)} = \frac{1 + \sum_{i=1}^{M} p(e_j | x_i)^{(t+1)} \cdot tf(i, n)}{N + \sum_{i=1}^{M} \left( p(e_j | x_i)^{(t+1)} \cdot \sum_{s=1}^{N} tf(i, s) \right)} \quad (5)$$

$$u_j^{(t+1)} = \frac{\sum_{i=1}^{M} p(e_j | x_i)^{(t+1)} \cdot time_i}{\sum_{i=1}^{M} p(e_j | x_i)^{(t+1)}} \quad (6)$$

$$\sigma_j^{2(t+1)} = \frac{\sum_{i=1}^{M} p(e_j | x_i)^{(t+1)} \cdot (time_i - u_j^{(t+1)})^2}{\sum_{i=1}^{M} p(e_j | x_i)^{(t+1)}} \quad (7)$$

where tf(i, n) is the term frequency of the word $w_n$ in the document $x_i$ and N is the corresponding vocabulary size. In (5), Laplace smoothing is applied to prevent zero probability for the infrequently occurring word. At last, the prior of each event is updated as:

$$p(e_j)^{(t+1)} = \frac{\sum_{i=1}^{M} p(e_j | x_i)^{(t+1)}}{M} \quad (8)$$

This algorithm can increase the log-likelihood consistently with iterations; and then converge to a local maximum. Once the parameters are estimated, storyboard generator 108 assigns each document to an event to generate event clusters 120, as following $$y_i = arg\ max_j(p(e_j|x_i)) \quad (9)$$

where $y_i$ is the event label of the document $x_i$.

This generative approach not only considers the temporal continuity of an event, it also addresses the issue that two or more events may overlap in some time durations. In this case, the Gaussian model of the event time can also be overlapped through this data-driven parameter estimation. From this view, the event clustering is also like a Gaussian mixture model (GMM) estimation in the time-line.

Number of Events (Event Number) Determination

In the above approach to event clustering, the event number K is assumed known (as shown in (3)-(8)). However, the event number may be difficult to determine a priori. In this implementation, the event number is estimated based on the document distribution along with the timeline. More particularly, it is assumed that each document is the result of an event, and the number of events changes with the development of the event. According to this property, each peak (or the corresponding contour) of the document distribution curve might indicate one event in a no overlapping event situation), as shown in FIG. 2.

Figure 2:
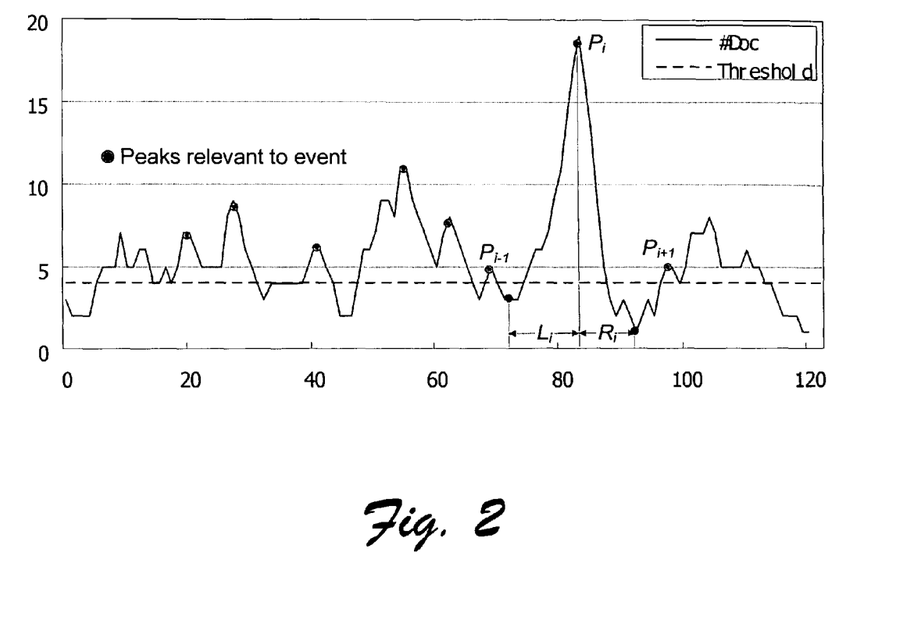
FIG. 2 shows a graph of an exemplary number of events for salient event number determination, according to one embodiment.

FIG. 2 shows a graph of an exemplary number of events for salient event number determination, according to one embodiment. As shown in FIG. 2, each peak $P_i$ is assumed to be correlated with a respective event associated with a given semantic topic. In view of this, the number of events associated with a respective event (the event number) is estimated by counting the peak number. However, the curve may be noisy. In this implementation, storyboard generator module 108 addresses any such noisy peaks such that only salient peaks are relevant to the event number. To detect the salient peaks, storyboard generator 108 smoothes the document curve with a half-Hamming (raise-cosine) window, and then removes the very small peaks with a threshold. FIG. 2 illustrates a smoothed document distribution with the corresponding threshold representing documents associated with a particular topic over period of time (e.g., a four month time period). In experiments, the threshold is adaptively set as $\mu_d$-$\sigma_d$/2, where $\mu_d$ and $\sigma_d$ are the mean and standard deviation of the curve, respectively.

After smoothing and tiny peak removal, storyboard generator 108 detects the minimum valleys between every two contingent peaks to identify an event (correlated to the corresponding peak) range (the envelope in the two valleys). As shown in FIG. 2, the duration denoted by $L_i+R_i$ is a rough range of the event correlated to the peak $P_i$. Assuming an important event usually has more associated documents and has longer duration affects, the saliency of each peak is defined as, $$S_i = \left(\frac{P_i}{P_{avr}}\right)\left(\frac{L_i + R_i}{D_{avr}}\right) \quad (10)$$

where $P_i$ is the ith peak, $L_i$ and $R_i$ is the duration from the ith peak to the previous and next valley; $P_{avr}$ is the average peak value and $D_{avr}$ is average duration between two valleys in the curve. $S_i$ is the saliency value. It could also be considered as the normalized area under peak $P_i$, and thus, it roughly represents the document number of the corresponding events.

In this implementation, the top K salient peaks are selected to determine the event number as follows:

$$K = argmax_k \left\{ \sum_{i=1}^{k} S'_i \Big/ \sum_{i=1}^{N} S'_i \leq \eta \right\} \quad (11)$$

where $S'_i$ is the sorted saliency value from large to small, N is total number of detected peaks and $\eta$ is a threshold. In one implementation, $\eta$ is set as 0.9, which roughly means that at least 90% documents will be kept in the further initialization and estimation of the event parameters in (3)-(8). Alternatively, a user can specify the initial value of K and the positions of salient peaks.

Figure 3:
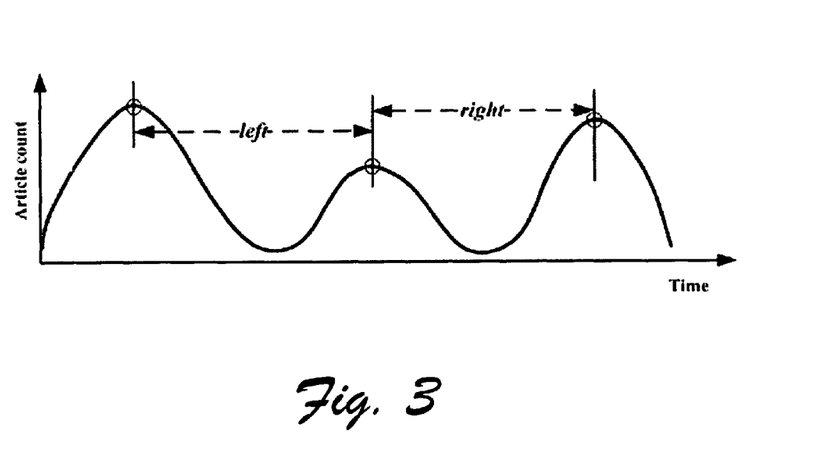
FIG. 3 shows another example for salient peak detection to determine the number of events, according to one embodiment.

FIG. 3 shows another example for salient peak detection to determine the number of events, according to one embodiment. Referring to FIG. 3, left (right) is the distance from a current peak to a first higher peak in the left (right) direction. In this implementation, salient scores for peaks are determined as follows:

$$score(peak)=left(peak)+right(peak) \quad (12)$$

There are illustrated definitions of operator left and right of peak. Salient score of the middle peak is the sum of left and right. Left(right) is defined as the distance from current peak to the first higher peak on the left(right) hand. The operators, left and right, return distance to the most adjacent higher peaks.

In one implementation of an initializing step, a hill-climbing approach is utilized to detect all peaks, and then compute salient score for each of detected peak. A configurable number of peaks are determined to be salient peaks. For example, in one implementation, the top 20% peaks are used as salient peaks, and the number of salient peaks is the initial estimation of k (number of events). Alternatively, a user can specify the initial value of k (e.g. if user is only interested in the top 10 events, k=10). Once the initial estimation of k and the positions of salient peaks have been determined, the events parameters are correspondingly initialized. Moreover, several different initial values of k can be obtained by splitting/ merging initial salient peaks. Usually, peaks representing many news articles, or with heavy tails, may be mixtures of multiple events. In such scenarios, the peak can be split to increase k and re-train the models.

In one implementation, log-likelihood is utilized to select a substantially optimal events number. Given this indicator, we apply the Minimum Description Length(MDL) principle to select among values of k:

$$k = \operatorname*{argmax}_{k}\left(\log(p(X; \theta)) - \frac{m_k}{2}\log(M)\right) \qquad (13)$$

$$m_k = 3k - 1 + k(N_p - 1) + k(N_l - 1) + k(N_n - 1)$$

where $m_k$ is the number of free parameters used in the model. $\log(p(X;\theta))$ is the log-likelihood of the joint distribution. The log-likelihood of the joint distribution is described above with respect to equation (3). As a consequence of this principle, when models with different values of k fit the data equally well, storybook generator module 108 selects the simplest model.

After determining the event number and generating initial event clusters 120 (the most salient peaks with their corresponding range), the event parameters could be initialized and then iteratively updated. This selection scheme is designed to substantially guarantee that important information will not be missed when generating the presentation for storyboard 112.

In one implementation, and as described below with respect to synchronizing music with storyboard content, the number of presented events may be further refined, based on user preference to match the presentation duration with music duration.

Event Summarization and Extraction of Representative Media

After obtaining the events, to richly present representative content associated with a semantic topic, storyboard generator 108 utilizes not only a concise event summary, but extracts some representative media to describe each event. To these ends, after obtaining the event clusters 120 and the corresponding documents, storyboard generator 108 generates a concise event summary (i.e., one or more representative events). In one implementation, news events are summarized in two ways. In one instance, news events are summarized by choosing some features with the maximum probabilities to represent the events. For example, for event j, the 'protagonist' is the person with the maximum p(person$_p$|e$_j$). Locations and keywords are similarly chosen. However, such summarizations may be difficult to read. Thus, as an alternative, a single news article is selected as the representative news article for each news event.

Once the probabilistic distributions of persons, locations, keywords and time conditioned on events has been determined, news articles are assigned to events by Maximum a Posterior(MAP) principle, as follows:

$$y_i = \operatorname*{argmax}_{j}(p(e_j | x_i)) \qquad (9)$$

Referring to Equation 9, $y_i$ is the label of news article $x_i$. The news article $x_i$ with the maximum p($x_i$|e$_j$) among articles assigned to the j-th event is a good representative of the event j, or the first article of each event is also a good representative.

Extracting Representative Media

In documents describing an event, there are usually many illustrational images, with possible flashes and video clips. However, when crawling web sites operations are utilized to obtain these document, the documents will typically include many noisy multimedia resources, such as the advertisements. In view of this, storyboard generator 108 implements noisy media detection operations to remove noisy media (respective portions of extracted multimodal information 118) associated with events in the event summary.

In one implementation, to remove any noisy media resources for each respective event in the event summary, storyboard generator 108 locates and removes resources associated with advertisements provided by entities other than those associated with web site(s) crawled to obtain the document(s) describing the event. To this end, storyboard generator 108 extracts advertisement host names from the URLs of all multimedia resources associated with the events, and removes resources associated with a different host name. These operations further identify media content representative of events in the event summary.

Additionally, for each event in the event summary, when multiple documents are associated with the event, the multiple documents may include duplicate images describing the event. To address any such duplicate images, storyboard generator 108 detects and removes any duplicate images from media (respective portions of extracted multimodal information 118) associated with events in the event summary. In this implementation, storyboard generator 108 implements an image signature scheme to detect and remove image duplicates. For example, in one implementation, storybook generator 108 converts each image into grayscale, and downsamples the converted image to 8×8 to obtain a 64-byte signature for each image. Then the Euclidean distance of the 64-byte signature is used as a dissimilarity measure. For instance, images with a 64-byte signatures that exhibit a configurable threshold of distance (e.g., a small distance) from one another are duplicate images. For each pair of duplicate images, storybook generator 108 removes one of the images from the representative content.

Subsequent to removing noisy resources and duplicate images, storyboard generator 108, for each event associated with the target topic, selects a subset of large images (e.g., 1-4 large images) or other media (e.g., video, etc.) from top representative documents (e.g., documents with the greatest p(xi|ej)). Storyboard generator 108 classifies the subset as being representative of the event (i.e., representative media 122). The exact number of selected images is based on an objective determination of the importance of the event and the total number of images associated with the event. Exemplary operations to determine event importance are described above in reference to document number.

Storyboard Generation

At this point, storyboard generator 108 integrates/fuses information from the event summary 120 and representative media 122 to generate a concise and informative storyboard 112, and thereby present each event associated with a target topic along with representative multimodal information. For purposes of exemplary illustration, the fused event summary and representative content are shown as representative media 122.

Figure 4:
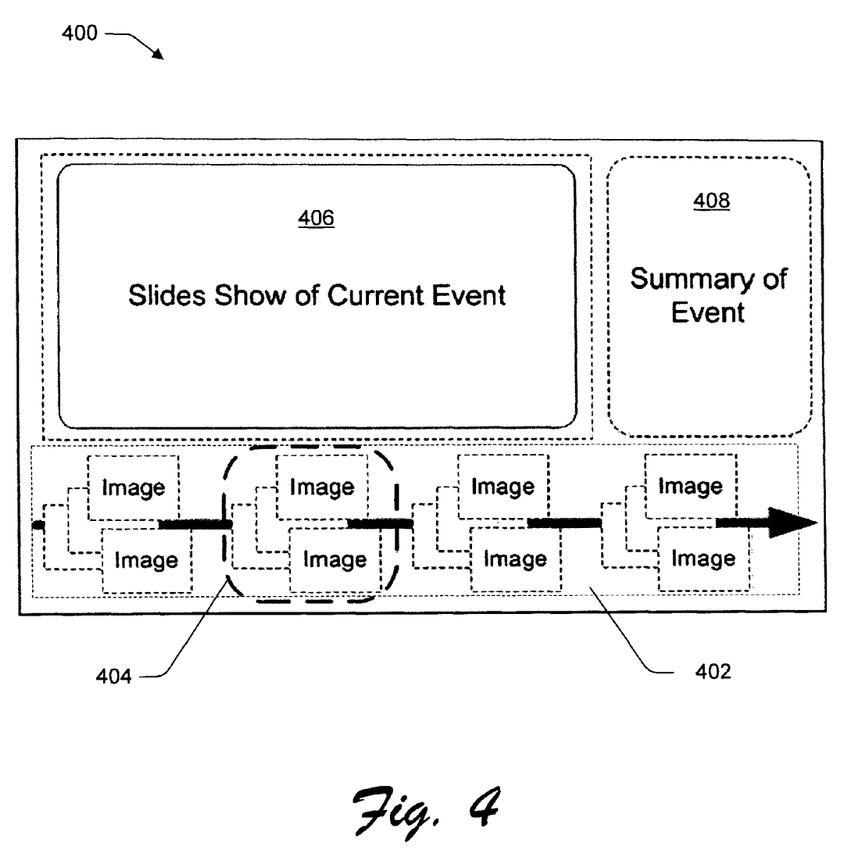
FIG. 4 shows an exemplary user interface layout of a storyboard, according to one embodiment.

FIG. 4 shows an exemplary user interface (UI) 400 layout of a storyboard 112, according to one embodiment. As shown, section 402 of the layout 400 shows representative media 122 (media associated with events) arranged in temporal order (i.e., the events are ordered by their respective timestamps). In section 402, a respective cluster of one or more images represents each event associated with a target topic. This enables a user to have a quick overview of past and future aspects of an event sequence. In this implementation, UI 400 highlights the current event. For example, image cluster 404 is circled and represents the current event being shown in section 406 of the UI.

Section 406 of UI 400 presents representative images of the current event. In this implementation, UI 400 presents the title and date of each document from which a respective representative image was extracted. For each document associated with section 406, section 408 presents a corresponding event summary for the document. In one implementation, section 408 also presents geographic information (e.g. map(s)) associated one or more of the summarized events. Such map(s) can be obtained by submitting the event location to a conventional online mapping service as a query.

Exemplary Music Synchronization

In one implementation, storyboard generator 108 also synchronizes representative media 122 in the storyboard 112 with incidental audio such as music to improve presentation of the representative content. Storyboard generator 108 aligns transitions between event slides (e.g., slides shown in section 406 of FIG. 4) with the music beats. It can be appreciated that music or other audio can also be related to a target topic. Music or other audio for synchronizing with the summarized content can be automatically identified, provided by a user, etc., and is represented by one or more of multimedia data 114 and other data 116).

To these ends, storyboard generator 108 detects onset sequences in selected music instead of the exact beat series to represent music rhythm. This is because the beat information is sometimes not readily apparent, especially in light music. In one implementation, the strongest detected onset in a configurable window of time is determined to be the music beat. This is reasonable since there are some beat positions in a time window (for example, 5 seconds); thus, the most possible position of a beat is the position of the strongest onset.

Figure 5:
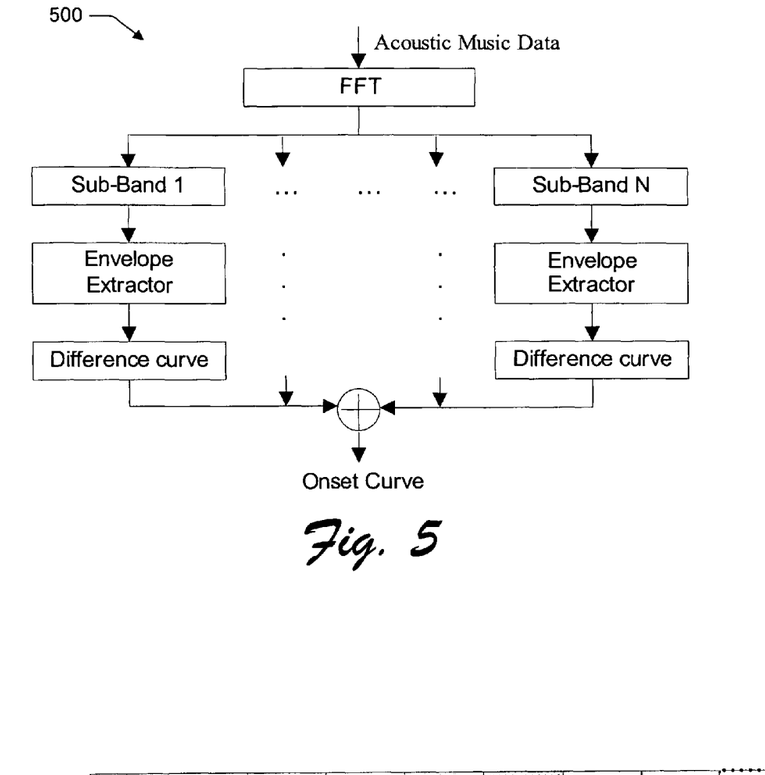
FIG. 5 shows an exemplary process of music onset sequence estimation, according to one embodiment.

FIG. 5 shows an exemplary process 500 of music onset sequence estimation, according to one embodiment. As shown, after FFT (Fast Fourier Transform) is performed on each frame of 16 ms-length, an octave-scale filter-bank is used to divide the frequency domain into six sub-bands, including $[0, \omega_0/2^6], [\omega_0/2^6, \omega_0/2^5], \ldots, [\omega_0/2^2, \omega_0/2]$, where $\omega_0$ refers to the sampling rate.

After the amplitude envelope of each sub-band is extracted by using a half-Hamming (raise-cosine) window, a Canny operator is used for onset sequence detection by estimating its difference function, $$D_i(n) = A_i(n) \otimes C(n) \quad (14)$$

where $D_i(n)$ is the difference function in the ith sub-band, $A_i(n)$ is the amplitude envelope of the ith sub-band, and $C(n)$ is the Canny operator with a Gaussian kernel, $$C(n) = \frac{i}{\sigma^2} e^{-i^2/2\sigma^2} \quad n \in [-L_c, L_c] \quad (15)$$

where $L_c$ is the length of the Canny operator and $\sigma$ is used to control the operator's shape, which are respectively set as twelve (12) and four (4) in this particular implementation.

Finally, the sum of the difference curves of these six sub-bands is used to extract onset sequence. Each peak is considered as an onset, and the peak value is considered as the onset strength.

Based on the obtained onsets, an incidental music is further segmented into music sub-clips, where a strong onset is taken as the boundary of a music sub-clip. Storybook generator 108 utilizes these music sub-clips as a timeline to synchronize event slide transitions in the storyboard. Thus, to satisfy the requirement that the event slide transitions of the storyboard should occur at the music beats storyboard generator 108 aligns the event slide boundaries and music sub-clip boundaries.

In this implementation, storyboard generator 108 maintains the music sub-clip so that it is not too short or too long, and that the length changes (i.e., not always the same length). In this implementation, the length of music sub-clips is randomly selected in a range of $[t_{min}, t_{max}]$ seconds. Thus, storyboard generator extracts music sub-clips as follows: given the previous boundary, the next boundary is selected as the strongest onset in the window which is $[t_{min}, t_{max}]$ seconds away from the previous boundary. In this implementation, a user can manually specify the range of the length of the music sub-clip. In this implementation, the default range in the system is set as a configurable [10, 15] seconds to provide a user with sufficient time to read all the information on each event slide.

Figure 6:
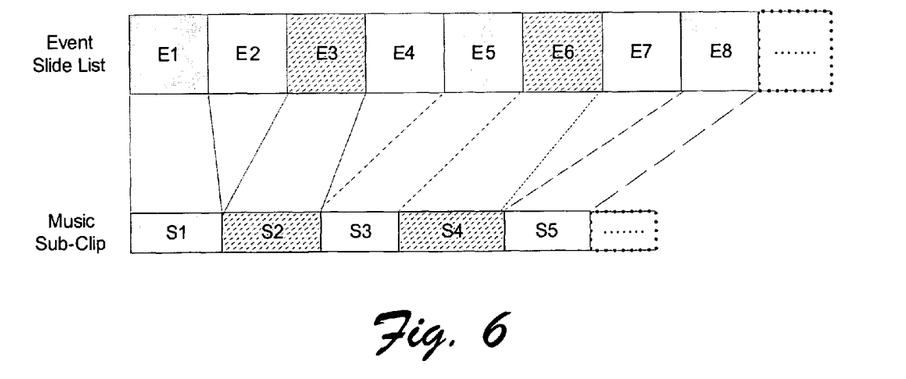
FIG. 6 shows an exemplary mapping of music sub-clip and storyboard slide-image synchronization, according to one embodiment.

FIG. 6 shows an exemplary mapping of music sub-clip and storyboard slide-image synchronization, according to one embodiment. To synchronize the transitions between different event slides and the beats of the incidental music, as mentioned above, storyboard generator 108 aligns the slide boundaries and music sub-clip boundaries. One way to accomplish this is to set the length of each event slide be equal to the corresponding length of the sub-music clip. However, as FIG. 5 illustrates, the number of event slides is usually not equal to the number of music sub-clip. In this implementation, storyboard generator 108 addresses this problem using one or more schemes.

For example, in one implementation storyboard generator 108 maps music sub-clips to storyboard slide images based on the music sub-clips. More particularly, storyboard generator 108 adaptively selects only the top N important events of the target topic for use used in the rich presentation, where N is the number of music sub-clip in the corresponding incidental music (e.g., please see FIG. 5). In this implementation, the importance score of an event is simply measured by the number of documents reporting it, assuming that the more important the event is, the more the corresponding documents is.

In another example, storyboard generator 108 maps music sub-clips to storyboard slide images based on specified event numbers. More particularly, a user specifies the number of events to view. For instance, a user may choose to show the top 30 important events, all events, or use some other criteria to determine the number of events to view. Storyboard generator 108, to accommodate all the events in the music duration, will repeat the incidental music if necessary, and then fade out the music at the end of the event presentation sequence.

In one implementation, after storyboard generator 108 aligns the representative content of the storyboard with the incidental music, storyboard generator 108 applies one or more slide-to-slide transition effects such as cross-fade, wipe and dissolve, etc. In one implementation storyboard generator 108 randomly selects one or more transition effects to connect the event slides.

Exemplary Procedure

Figure 7:
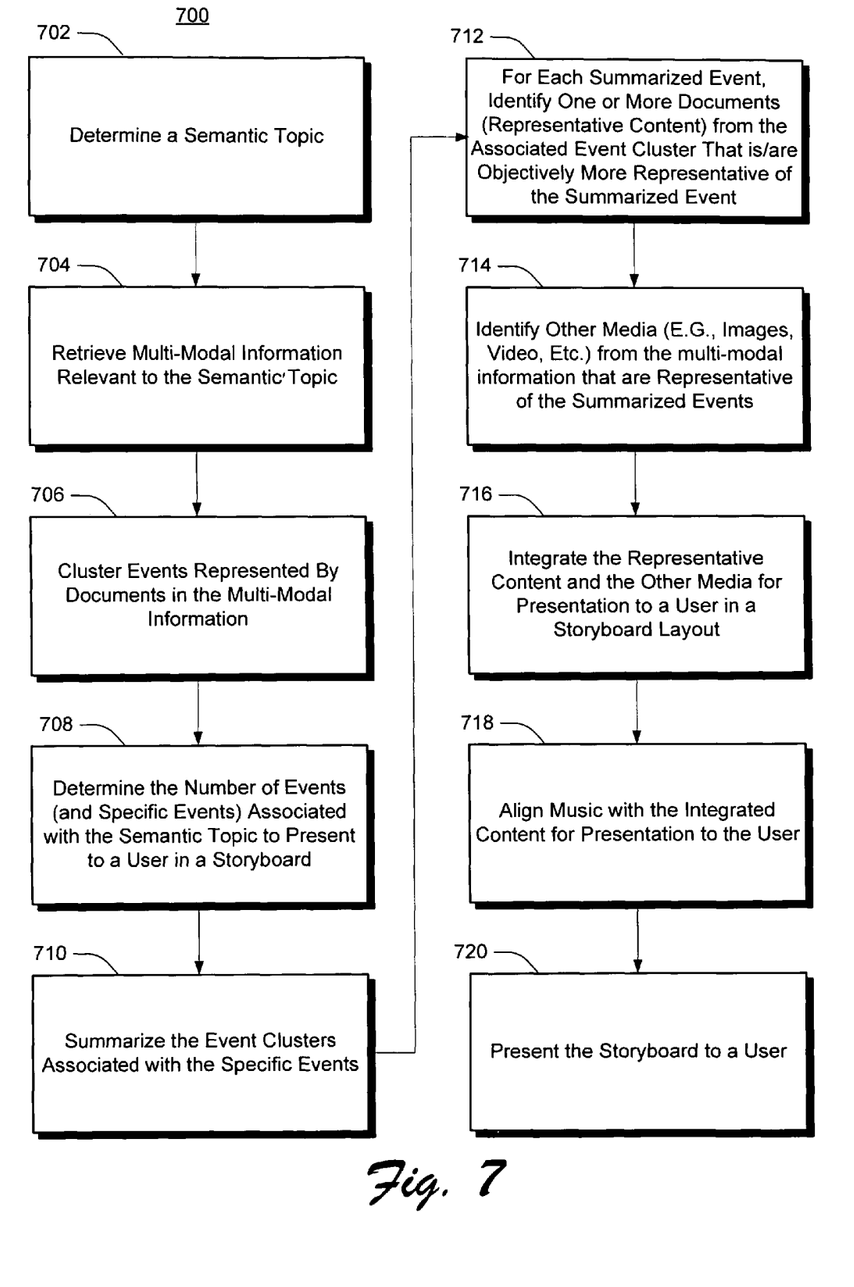
FIG. 7 illustrates a procedure for automated rich presentation of a semantic topic, according to one embodiment.

FIG. 7 illustrates a procedure 700 for automated rich presentation of a semantic topic, according to one embodiment. For purposes of exemplary illustration, the operations of this procedure are described in reference to the components of system 100 of FIG. 1. At block 702, storyboard generator module 108 determines a semantic topic. In one implementation, the semantic topic is identified by one or more keywords of a submitted search query. At block 704, storyboard generator module 108 analyzes multimedia data 114 to retrieve multimodal information that is relevant to the semantic topic. At block 706, storyboard generator module 108 generates event clusters 120 to cluster events and corresponding documents associated with the semantic topic. Each event cluster 120 represents the respective event associated with the semantic topic as described by respective ones of one or more documents (e.g., news articles) from the retrieved multimodal information. At block 708, storyboard generator module 108 determines the number of events associated with the semantic topic to present to a user in storyboard 112. In one implementation, the number of events is estimated based on document distribution along a corresponding timeline.

At block 710, storyboard generator module 108 summarizes the event clusters 120. At block 712, storyboard generator module 108, for each summarized event, identifies one or more documents that are objectively more representative of the event associated with the corresponding event cluster 120. At block 714, storyboard generator module 108 identifies other media (e.g., images, video, etc.) from the retrieved multimodal information. This other media is objectively determined to be representative of the summarized events. At block 716, storyboard generator module 108 integrates the representative documents and the other media (i.e., representative content 122) for presentation to a user in a layout for the storyboard 112. At block 718, storyboard generator module 108 aligns music with the integrated content for presentation to the user. At block 720, storyboard generator module 108 presents the storyboard 112 to a user. This organized presentation allows the user to quickly grasp and understand the semantic topic.

An Exemplary Operating Environment

Figure 8:
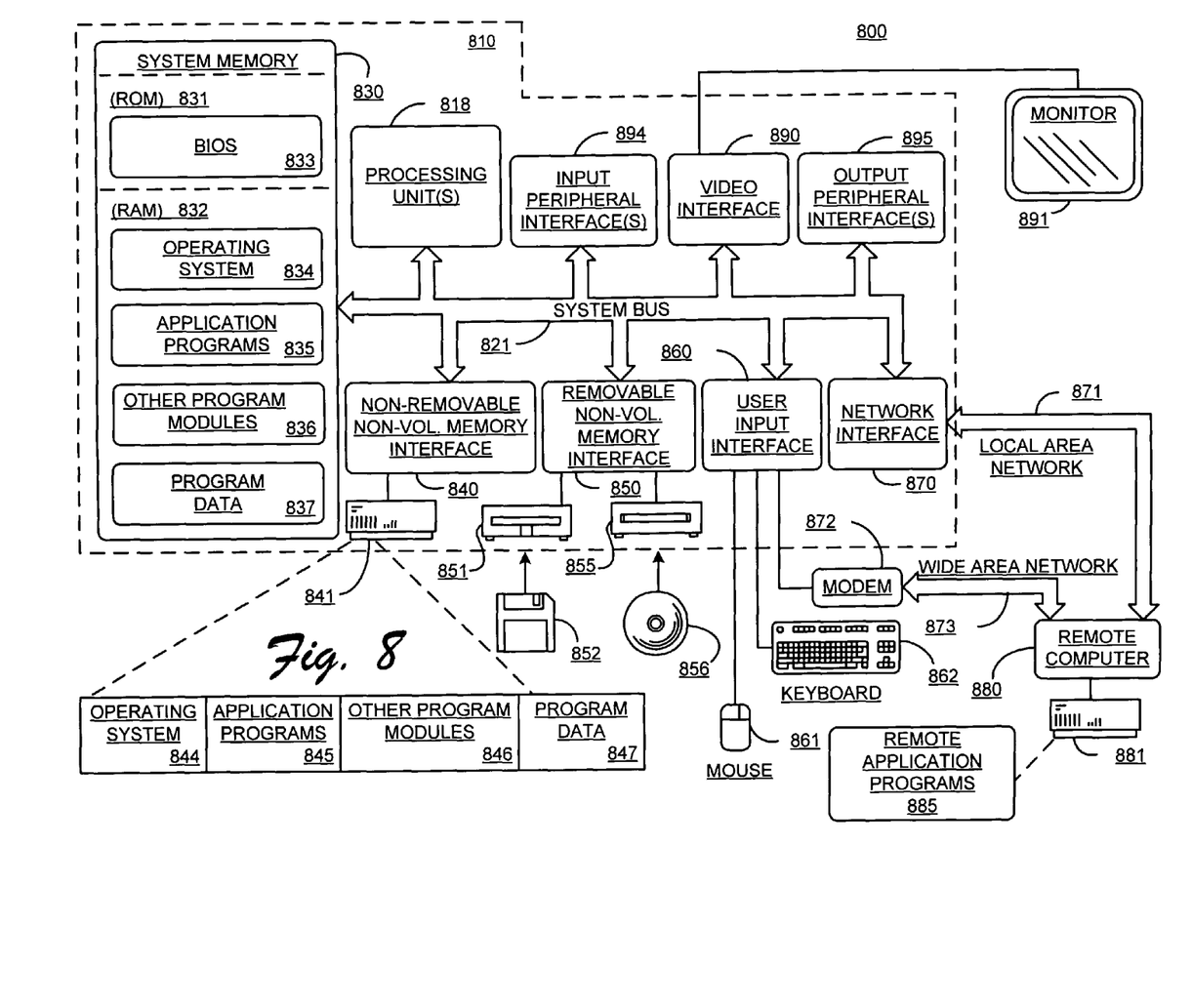
FIG. 8 shows an exemplary environment wherein automated rich presentation of a semantic topic can be partially or fully implemented, according to one embodiment.

FIG. 8 illustrates an example of a suitable computing environment in which automated rich presentation of a semantic topic may be fully or partially implemented. Exemplary computing environment 800 is only one example of a suitable computing environment for the exemplary system 100 of FIG. 1, and is not intended to suggest any limitation as to the scope of use or functionality of systems and methods the described herein. Neither should computing environment 800 be interpreted as having any dependency or requirement relating to any one or combination of components illustrated in computing environment 800.

The methods and systems described herein are operational with numerous other general purpose or special purpose computing system, environments or configurations. Examples of well-known computing systems, environments, and/or configurations that may be suitable for use include, but are 4 not limited to personal computers, server computers, multiprocessor systems, microprocessor-based systems, network PCs, minicomputers, mainframe computers, distributed computing environments that include any of the above systems or devices, and so on. Compact or subset versions of the framework may also be implemented in clients of limited resources, such as handheld computers, or other computing devices. The invention is practiced in a networked computing environment where tasks are performed by remote processing devices that are linked through a communications network.

With reference to FIG. 8, an exemplary system providing automated rich presentation of a semantic topic architecture includes a general-purpose computing device in the form of a computer 810 implementing, for example, storyboard generating operations associated with computing device 102 of FIG. 1. Components of computer 810 may include, but are not limited to, processing unit(s) 818, a system memory 830, and a system bus 821 that couples various system components including the system memory to the processing unit 818. The system bus 821 may be any of several types of bus structures including a memory bus or memory controller, a peripheral bus, and a local bus using any of a variety of bus architectures. By way of example and not limitation, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

A computer 810 typically includes a variety of computer-readable media. Computer-readable media can be any available media that can be accessed by computer 810, including both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example and not limitation, communication media includes wired media such as a wired network or a direct-wired connection, and wireless media such as acoustic, RF, infrared and other wireless media. Combinations of the any of the above should also be included within the scope of computer-readable media.

System memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during startup, is typically stored in ROM 831. RAM 832 typically contains data and/or program modules that are immediately accessible to and/or presently being operated on by processing unit 818. By way of example and not limitation, FIG. 8 illustrates operating system 834, application programs 835, other program modules 836, and program data 837.

The computer 810 may also include other removable/non-removable, volatile/nonvolatile computer storage media. By way of example only, FIG. 8 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media discussed above and illustrated in FIG. 8, provide storage of computer-readable instructions, data structures, program modules and other data for the computer 810. In FIG. 8, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that they are at least different copies.

A user may enter commands and information into the computer 810 through input devices such as a keyboard 862 and pointing device 861, commonly referred to as a mouse, trackball or touch pad. Other input devices (not shown) may include a microphone, joystick, graphics pen and pad, satellite dish, scanner, etc. These and other input devices are often connected to the processing unit 818 through a user input interface 860 that is coupled to the system bus 821, but may be connected by other interface and bus structures, such as a parallel port, game port or a universal serial bus (USB). In this implementation, a monitor 891 or other type of user interface device is also connected to the system bus 821 via an interface, for example, such as a video interface 890. Monitor 891 is used to present storyboard 112 of FIG. 1 to a user for rich presentation of a semantic topic.

The computer 810 operates in a networked environment using logical connections to one or more remote computers, such as a remote computer 880. The remote computer 880 may be a personal computer, a server, a router, a network PC, a peer device or other common network node, and as a function of its particular implementation, may include many or all of the elements described above relative to the computer 810, although only a memory storage device 881 has been illustrated in FIG. 8. The logical connections depicted in FIG. 8 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example and not limitation, FIG. 8 illustrates remote application programs 885 as residing on memory device 881. The network connections shown are exemplary and other means of establishing a communications link between the computers may be used.

CONCLUSION

Although the above sections describe an automated rich presentation of a semantic topic architecture in language specific to structural features and/or methodological operations or actions, the implementations defined in the appended claims are not necessarily limited to the specific features or actions described. Rather, the specific features and operations for automated rich presentation of semantic topics are disclosed as exemplary forms of implementing the claimed subject matter. For example, in one implementation, Bayesian Information Criteria (BIC) or minimum description length (MDL) is used to estimate substantially optimal event numbers. This is accomplished by searching through a range of event numbers to find the event number that maximizes the likelihood in equation (3).

The invention claimed:

1. A computer-implemented method comprising:
   determining a semantic topic;
   evaluating respective portions of multimodal information corresponding to the semantic topic to identify events, each event being associated with one or more of person, time, location, and keyword;
   for each document in the respective portion, calculating probability that the document belongs to an event of the events based on a generative model and document distribution along a timeline associated with the event;
   for each event in least a subset of the events:
      objectively identifying one or more representative documents that are of greater relevance to the event as compared to other documents;
      extracting other media corresponding to the representative documents from the multimodal information, the representative documents and the other media being objectively most representative of the semantic topic; and
      wherein the one or more representative documents and the other media are for presentation to a user in a storyboard.

2. The method of claim 1, wherein the at least a subset of the events is an event summary.

3. The method of claim 1, wherein calculating the probability further comprises:
   identifying a salient number of events corresponding to the semantic topic, the salient number of events being less than a total number of the events; and
   calculating the probability using the salient number of events.

4. The method of claim 1, wherein calculating the probability further comprises representing the probability associated with time as a function of where a date of the document lies with respect to event duration.

5. The method of claim 1, wherein calculating the probability further comprises:
independently estimating, for respective person, location, and keyword models, model parameters by iterative expectation and maximization operations; and
calculating the probability using the models in view of temporal continuity of the event and any overlap of two or more of the events.

6. The method of claim 1, further comprising, for each document in the representative documents, removing any resource associated with an advertisement provided an entity other than an entity associated with a web site from which the document was obtained.

7. The method of claim 1, further comprising, for each event in the at least a subset of the events, if the representative documents include multiple documents, removing any duplicate image from the multiple documents.

8. The method of claim 1, wherein the one or more representative documents and the other media are representative content, and wherein the method further comprises integrating the representative content into the storyboard for presentation to a user, the storyboard providing a concise overview of salient event(s) and associated multimodal information regarding the semantic topic.

9. The method of claim 1, further comprising synchronizing the representative content of the storyboard layout with music.

10. The method of claim 9, wherein the synchronizing further comprises:
identifying music sub-clips and a corresponding timeline; and
synchronizing event slide transitions and the storyboard layout with the music sub-clips using the timeline.

11. The method of claim 9, wherein the synchronizing further comprises:
identifying music sub-clips and a corresponding timeline;
synchronizing event slide transitions and the storyboard layout with the music sub-clips using the timeline; and
wherein a length of an event slide is equal to a corresponding length of a respective music sub-clip.

12. The method of claim 9, wherein the synchronizing further comprises:
identifying music sub-clips and a corresponding timeline;
synchronizing event slide transitions and the storyboard layout with the music sub-clips using the timeline; and
wherein each event associated with the event slide transitions is objectively determined to belong to a set of events in the at least a subset of events that are more important than other events in the at least a subset of events.

13. A computer implemented method comprising:
determining a semantic topic;
extracting, from multimedia data, multimodal information relevant to the semantic topic;
evaluating respective portions of the multimodal information to identify events, each event being associated with one or more of person, time, location, and keyword;
for each document in the respective portion, calculating probability that the document belongs to an event of the events based on a generative model and document distribution along a timeline associated with the event;
generating an event summary summarizing the events;
for each event in the event summary:
objectively identifying one or more representative documents that are of greater relevance to the event as compared to other documents; and
extracting other media corresponding to the representative documents from the multimodal information, the representative documents and the other media being representative content;
integrating the representative content into a storyboard layout for presentation to a user, the storyboard layout providing a concise overview of salient event(s) and associated multimodal information regarding the semantic topic.

14. The method of claim 13, wherein calculating the probability further comprises:
identifying a salient number of events corresponding to the semantic topic, the salient number of events being less than a total number of the events; and
calculating the probability using the salient number of events.

15. The method of claim 13, wherein calculating the probability further comprises:
independently estimating, for respective person, location, and keyword models, model parameters by iterative expectation and maximization operations; and
calculating the probability using the models in view of temporal continuity of the event and any overlap of two or more of the events.

16. The method of claim 13, further comprising removing, from a document of the one or more representative documents, one or more of a duplicate image and an advertisement associated with any entity other than an entity associated with a web site from which the document was obtained.

17. The method of claim 13, further comprising synchronizing the representative content of the storyboard layout with music.

* * * * *